(No Model.)
D. K. STONE.
HORSE DETACHER.
No. 498,322. Patented May 30, 1893.
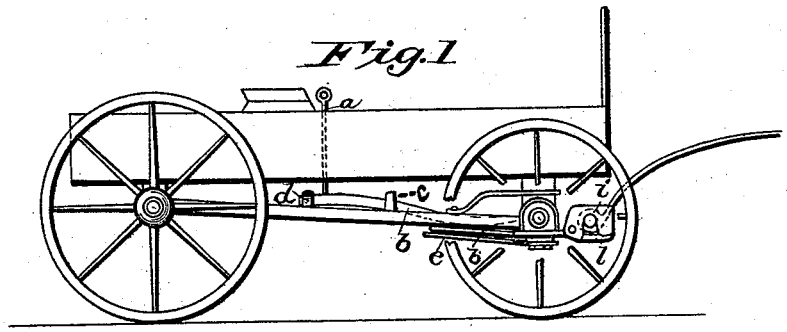
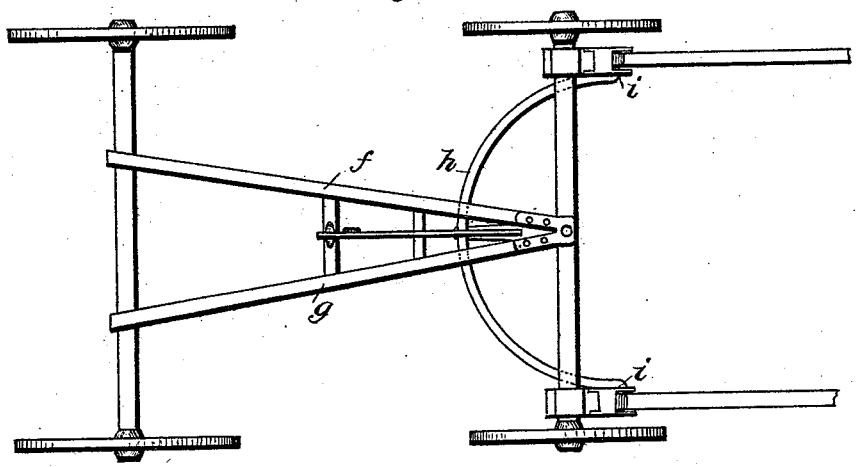
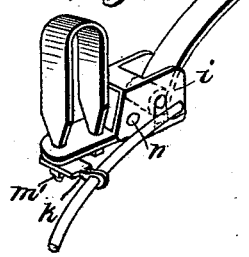 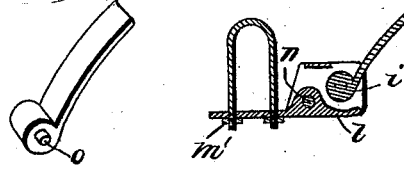 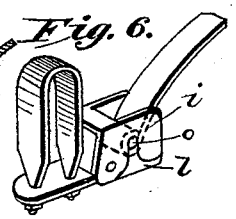
WITNESSES
INVENTOR
David K. Stone
by Charles A. Rogers
Attorney

UNITED STATES PATENT OFFICE.

DAVID K. STONE, OF BLOOMINGDALE, MICHIGAN.

HORSE-DETACHER.

SPECIFICATION forming part of Letters Patent No. 498,322, dated May 30, 1893.

Application filed December 22, 1892. Serial No. 456,069. (No model.)

*To all whom it may concern:*

Be it known that I, DAVID K. STONE, a citizen of the United States, residing at Bloomingdale, in the county of Van Buren and State of Michigan, have invented certain new and useful Improvements in Detaching Horses from Vehicles; and I do hereby declare the following to be a full, clear, and exact description of the invention, such as will enable others skilled in the art to which it appertains to make and use the same.

My invention relates to improvements in detaching horses from vehicles, in which the shafts or tongue is detached from the forward axle; and the objects of my improvement are to detach the horse or horses from the vehicle in the event of their becoming unmanageable, to provide a convenient, quick, and easy method of changing the shafts or pole, to secure an anti-rattling thill coupling, and to dispense with the use of bolts and nuts as in the ordinary coupling. I attain these objects by means of the mechanism illustrated in the accompanying drawings in which—

Figures 1 and 2 show my improvement when applied to a vehicle. Figs. 3, 4, 5 and 6 are details.

Like letters refer to like parts throughout the several views.

The rod $a$, Fig. 1, extends upward from the inner end of the lever $b$ through the floor of the vehicle just forward of the seat, and in easy reach of the driver, the lever $b$, is pivoted to a support or brace $c$, which is attached to the running gear or coupling poles $fg$, said lever being held in position by a clamp $d$ also attached to the running gear or coupling poles $fg$, but nearer the rear axle than the pivot. The spring $e$ is attached to the forward axle by the bolt that secures the running gear or coupling poles $fg$ to the forward axle, and forms the pivot upon which the same is made to turn, the said spring $e$ impinges against and supports the circular rod $h$ which is attached at either extremity to the movable jaws $ii$ of the thills and passes through the supports or braces $kk$, bolted to the forward axle, and thus forming the pivot upon which said circular rod $h$ oscillates when forced down by the lever $b$.

The movable jaws $ii$, forming part of the thill coupling, are constructed to attach on either side of the rigid jaws $l,l$, by a pin, which forms the pivot upon which the said movable jaws $ii$ are elevated or depressed; the lower or rigid jaws $ll$ are formed of one piece of metal made to receive the bolts $m'm'$, which attach said jaws $ll$ to the forward axle, and also to receive the pins $nn$ forming the pivot of the movable jaws $i.i$ before described. The letters $oo$ represent the attachment upon the rear end of the shafts or poles, which are engaged and securely held by the movable jaws $ii$; this attachment $oo$ can be formed by driving the bolts ordinarily used to secure the shafts or poles to the thill into the holes provided in the ends of the irons secured to the shafts or poles, and securing said bolts rigidly in said holes by means of wedges, and then cutting the ends of said bolts which project beyond the outside of said movable jaws $ii$, or the attachments upon the rear end of the shafts or poles can be constructed with reference to this improved coupling herein described. By pulling up upon the rod $a$ the lever $b$, is released from the clamp $d$ and forces the circular rod $h$ downward, which in turn elevates the movable jaws $ii$ and thus the attachments of the shafts or poles are released without the labor or trouble usually incident upon such an undertaking.

Having thus fully described my invention, what I claim, and desire to secure by Letters Patent, is—

A horse detacher comprising a pair of jaws to clamp the thills, a semi-circular rod connected at its ends to one member of the jaws, and a lever pivoted to the vehicle frame for bearing on the semi-circular rod for throwing it down to open the jaws and release the thills, substantially as described.

In testimony whereof I affix my signature in presence of two witnesses.

DAVID K. STONE.

Witnesses:
   R. M. BROWN,
   CHAS. KIMFER.